Aug. 14, 1923.
E. HILWIG
SAWING MACHINE
Filed Feb. 4, 1922
1,464,679
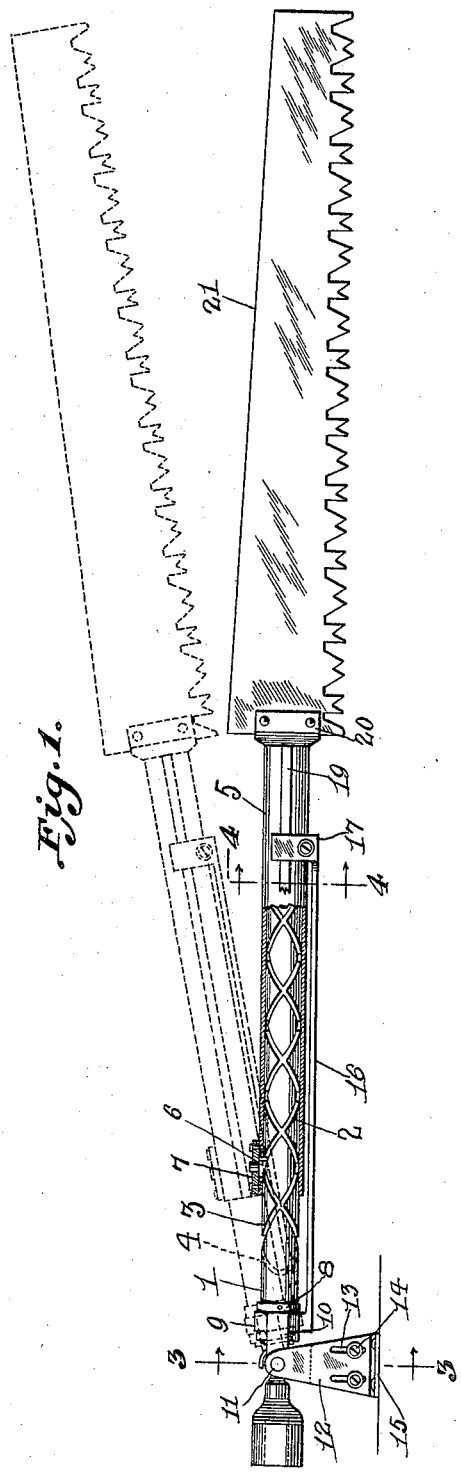
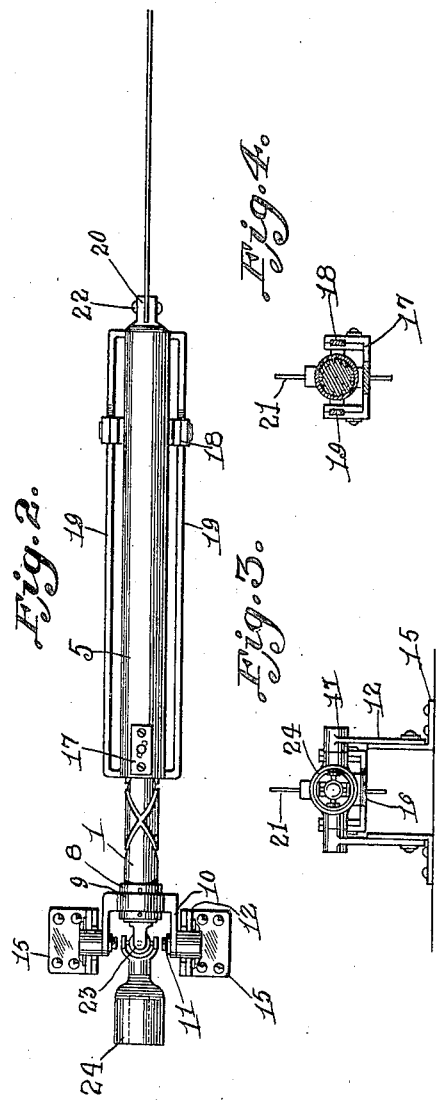
Inventor
Edward Hilwig
By Mason Fenwick & Lawrence,
Attorneys Patented Aug. 14, 1923.

1,464,679

UNITED STATES PATENT OFFICE.

EDWARD HILWIG, OF CLARKS GREEN, PENNSYLVANIA.

SAWING MACHINE.

Application filed February 4, 1922. Serial No. 534,204.

*To all whom it may concern:*

Be it known that I, EDWARD HILWIG, a citizen of the United States, residing at Clarks Green, in the county of Lackawanna and State of Pennsylvania, have invented certain new and useful Improvements in Sawing Machines; and I do hereby declare the following to be a full, clear, and exact description of the invention, such as will enable others skilled in the art to which it appertains to make and use the same.

This invention relates to new and useful improvements in sawing machines and more particularly to means for imparting movement to a reciprocating saw, the main object of the present invention being the provision of a sawing machine including suitable means for reciprocating the saw blade and additional means whereby the saw blade may be readily raised and lowered with respect to the work to be operated upon.

A further object of the present invention is the provision of a sawing machine including means whereby to reciprocate a saw blade through the work to be operated upon, said means being suitably connected with any suitable source of power and the further provision of means whereby said saw blade may be raised and lowered in accordance with the position required for operating upon the work.

A still further object of the present invention is the provision of means for mounting my improved sawing machine whereby the operating mechanism can be readily adjusted without interfering with the power applied to the operating mechanism so that the instrument can be readily adjusted while in motion.

With the above and other objects in view, the invention consists in the novel features of construction, combination and arrangement of parts hereinafter more fully set forth, pointed out in the claims and shown in the accompanying drawings, in which:

Figure 1 is a side elevation of a sawing machine constructed in accordance with my invention, parts thereof being broken away and illustrated in cross section;

Fig. 2 is a top plan view;

Fig. 3 is a sectional view taken on the line 3—3 of Fig. 1, and

Fig. 4 is a sectional view taken on the line 4—4 of Fig. 1.

My invention as illustrated in the accompanying drawings, comprises a rotatable drum 1 and provided in its surface with right and left hand grooves or threads 2 and 3 connected at their ends by intersecting or return grooves 4, thus forming a continuous right and left thread or groove longitudinally along the surface of the drum.

Movable upon this drum is a tube or casing 5 and secured to the tube 5 at the inner end thereof is a traveler block 6 which projects into the grooves of the drum and is adapted to traverse the same, said traveler being properly shaped to easily fit the walls of the groove and turn freely therein without excessive friction, the return portions 4 of the grooves being sufficiently wide to adapt the traveler block 6 to pass without binding in a curved path from the right to the left hand groove and vice-versa. This traveler block 6 is preferably mounted within a removable plate 7 whereby should the block become worn or broken it can be readily removed and replaced by a new one.

The drum 1 is supported normally in a horizontal position by having a sleeve 8 mounted upon the inner end thereof and fitted within an annular bearing ring 9, said bearing ring being provided at diametrically opposite points with arms 10 which extend at right angles to the bearing ring and are pivotally mounted upon the pins 11. These pins 11 are supported in the upper end of the movable bearing plates 12, said plates having slots 13 therein adapted to receive adjustment bolts 14 which are carried by the main supporting brackets 15 whereby the height of the drum 1 may be readily varied by adjusting the bearing plates 12.

Formed integral with the bearing ring 9 at the lower side thereof and extending parallel with the drum 1 is a supporting plate 16, the outer end of which is provided with oppositely disposed arms 17, the ends of which extend upwardly upon opposite sides of the drum 1 and are provided with suitable bearings as at 18 to receive the guide rods 19 carried by the tube 5. These guide rods may be integrally or detachably connected with opposite ends of the tube 5 and preferably disposed upon opposite sides of the tube and movable through the bearings 18. The outer end of the tube 5 is provided with spaced ears 20 between which the inner ends of a saw blade 21 is arranged, said saw blade being retained in position in any suitable manner, in the present instance, it being illustrated as retained in position by means of the rivets 22, although it will be understood that removable fastening means may be provided so that the saw blade can be detached for sharpening or repairing.

The inner end of the drum 1 is connected by means of a universal joint 23 to a connector as shown at 24, said connector being provided for connection with any suitable source of power whereby to impart rotary movement to the drum 1 whereby it will be apparent that upon rotation of the drum 1, the tube 5 to which the saw blade 21 is connected, will be reciprocated upon the drum by having the traveling block 6 moving within the grooves 2 and 3. It will also be apparent that by having the bearing ring 9 pivotally connected with the supporting bearings and by the use of the universal joint 23, the saw blade together with the drum 1 and tube 5 may be raised and lowered as required, the device being illustrated in a raised position as shown in dotted lines in Fig. 1.

From the above description taken in connection with the accompanying drawings, it will be readily apparent that I have provided a sawing machine whereby the reciprocating mechanism of the saw is connected to the motive power in such a manner as to permit the reciprocating mechanism and the saw blade to be raised and lowered and positioned at various angles in accordance with the material which is being operated upon. The device in itself is extremely simple in construction, effective in operation and the assembling of the device is such as to provide for considerable endurance.

I claim:

1. A sawing machine including a supporting collar, a drum having one end rotatably supported within said collar, a member connected with one end of said drum whereby to provide for the connection of the drum with suitable motive power, said drum having right and left spiral grooves terminally connected to form a continuous groove, a tube mounted for longitudinal movement upon said drum and a traveler block carried by the inner end of the tube and movable within said grooves.

2. A sawing machine including a supporting collar, a drum rotatably mounted within said support, said drum having right and left spiral grooves terminally connected to form a continuous groove, a tube mounted for movement upon said drum, a traveler block carried by the inner end of said tube and movable within the grooves of the drum upon rotation of said drum whereby to impart longitudinal movement to the tube, a supporting plate having connection with the support and extending parallel with the drum, bearing at the outer end of said supporting plate and guide rods carried by the tube for movement through said bearings, as and for the purpose set forth.

In testimony whereof I affix my signature.

EDWARD HILWIG.